L. W. Johanning, Jr.,
Bolt Cutter.
No. 47,956. Patented May 30, 1865.
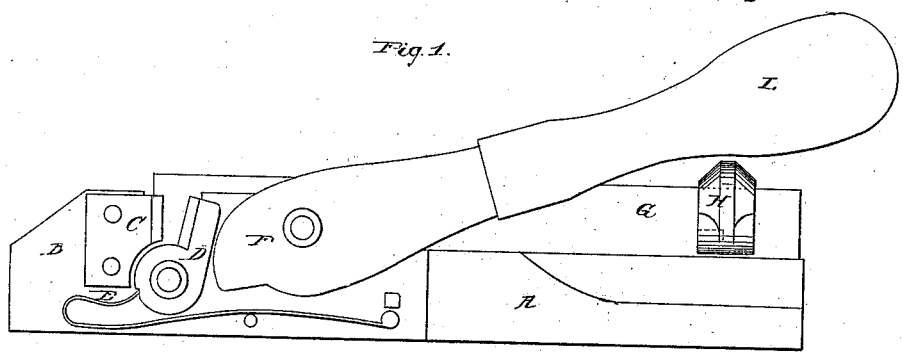
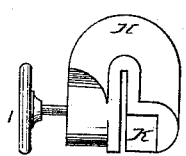
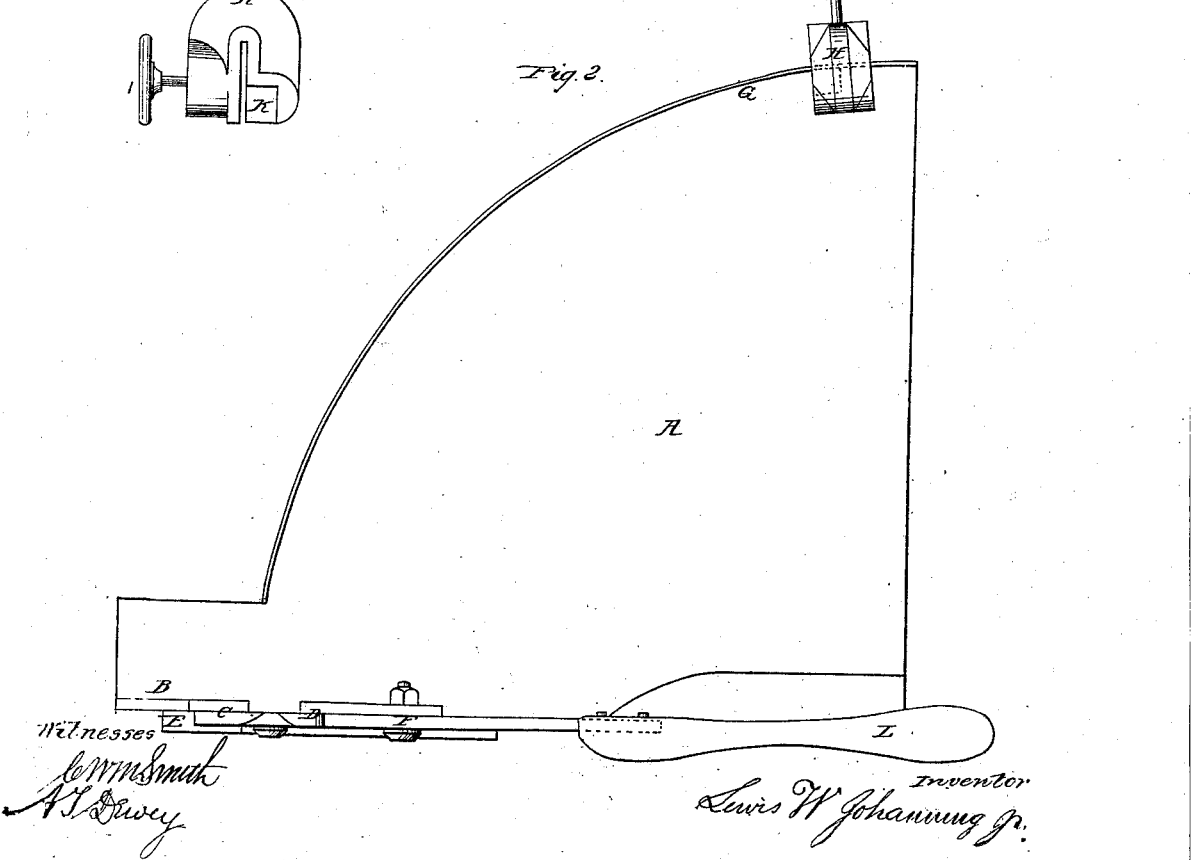
Witnesses
Inventor
Lewis W. Johanning Jr.

UNITED STATES PATENT OFFICE.

LEWIS W. JOHANNING, JR., OF SAN FRANCISCO, CALIFORNIA.

WIRE-CUTTING MACHINE.

Specification forming part of Letters Patent No. 47,956, dated May 30, 1865.

*To all whom it may concern:*

Be it known that I, LEWIS WASHINGTON JOHANNING, Jr., of the city and county of San Francisco, State of California, have invented a new and useful Machine for Cutting Wire, Rods, Plate, &c.; and I do hereby declare that the following specification, with the accompanying drawings, is sufficient to enable any person skilled in the art or science to which it most nearly appertains to make and use my invention or improvements without further invention or experiment.

The nature of my invention and improvements in machines for cutting wire, rods, &c., consists in the construction and arrangement of devices hereinafter described.

To enable others skilled in the art to make and use my invention, I will proceed to describe its construction and operation, referring to the accompanying drawings, in which the same letters indicate like parts in each of the figures.

Figure 1 is a plan or top view of the machine. Fig. 2 is an elevation of the front side.

In these drawings, A is a strong piece of plank or other material, which may be in the form of a quarter of a circle, as shown in Fig. 2, with a projection at the left-hand corner, where the face-plate B is firmly fastened to it— the plank A. The stationary cutter C is made in the form shown in the drawings, and firmly fastened to the plate B. The vibrating cutter D is also made in the form shown in the drawings, and arranged to vibrate on a stud or pin in the plate B. The cutter D is pressed toward the cutter C to cut off the wire or rod interposed between them by the cam F on the end of the lever L, which cam vibrates on a bolt in the plate B, as shown in the drawings. The operator can take the lever L in his hand and work it up and down to operate the cutter and sever the wire with one hand, while he feeds it in between the cutters with his other hand. The spring E is made in the form shown in Fig. 1, and fastened to the plate B to act on the cutter D and throw it from the cutter C to make room to insert the wire to be cut. The curved plate G is fastened to the curved edge of the plank A and projects some distance above it. This plate should be curved to correspond or nearly correspond with the curve of the wire to be cut, so that as the wire is fed in between the cutters it can lay on the plank inside of the plate G, with its end against the stop or gage H, which governs the length of the pieces of wire cut. This gage H is provided with a set-screw, I, by which it may be fastened on any part of the plate G, to gage the length of the pieces of wire to be cut.

I claim—

The combination and arrangement of the plank or platform A with the stationary cutter C, vibrating cutter D, cam-lever F L, curved guide G, and gage H, the whole being constructed as described, for the purposes set forth.

LEWIS W. JOHANNING, JR.

Witnesses:
C. W. M. SMITH,
A. T. DEWEY.